United States Patent [19]
Weber

[11] Patent Number: 5,971,741
[45] Date of Patent: Oct. 26, 1999

[54] BLOW PIN ASSEMBLY FOR A ROTARY BLOW MOLDING MACHINE

[75] Inventor: Lawrence H. Weber, Ypsilanti, Mich.

[73] Assignee: R & B Machine Tool Company, Saline, Mich.

[21] Appl. No.: 09/064,398

[22] Filed: Apr. 22, 1998

[51] Int. Cl.⁶ .......................... B29C 49/04; B29C 49/36; B29C 49/58
[52] U.S. Cl. .......................... 425/535; 264/542; 425/540
[58] Field of Search .................... 425/532, 540, 425/535, 525; 264/540, 542

[56] References Cited

U.S. PATENT DOCUMENTS

| | | | |
|---|---|---|---|
| 3,457,592 | 7/1969 | Winchester, Jr. | 425/532 |
| 3,608,135 | 9/1971 | Schurman | 425/535 |
| 4,248,582 | 2/1981 | Martin, Jr. | 425/531 |
| 4,421,472 | 12/1983 | Martin, Jr. | 425/527 |
| 4,505,664 | 3/1985 | Craig | 425/535 |
| 4,919,607 | 4/1990 | Martin et al. | 425/535 |
| 5,840,349 | 11/1998 | Brown, Jr. et al. | 425/532 |

FOREIGN PATENT DOCUMENTS

| | | | |
|---|---|---|---|
| 2249759 | 5/1975 | France | 425/532 |
| 2113086 | 10/1972 | Germany | 425/535 |

*Primary Examiner*—Robert Davis
*Attorney, Agent, or Firm*—Reising, Ethington, Barnes, Kisselle, Learman & McCulloch, P.C.

[57] ABSTRACT

A blow pin assembly for a rotary blow molding machine having a carrousel that supports a number of molds located about the circumference of the carrousel. Each mold includes a separate blow pin assembly mounted on the mold clamp. The blow pin assemblies each includes a base, a carriage supported by the base, a sub-base supported by the carriage, and a blow pin mounted to the sub-base for movement therewith. The carriage moves the sub-base and blow pin linearly along a first path from a home position, in which the blow pin is retracted away from the mold opening, to an alignment position, in which the blow pin is located directly above the mold opening. The sub-base then moves the blow pin in a direction perpendicular to the first path from the alignment position into a mold-engaging position, in which the blow pin is inserted into the mold opening. This sequential, orthogonally-related motion allows the blow pin to be retracted away from the mold opening during the parison extrusion operation, yet permits the blow pin to enter the mold opening along a linear path that is coincident with the central axis of the mold. This motion permits pre-blowing of the blow pin and helps minimize the opportunity for the blow pin to catch and fold over the upper edge of the parison. The blow pin assembly can include a pair of stop members that positively engage each other when the blow pin has reached its alignment position.

20 Claims, 5 Drawing Sheets

BLOW PIN ASSEMBLY FOR A ROTARY BLOW MOLDING MACHINE

TECHNICAL FIELD

This invention relates to blow pin assemblies used on rotary blow molding machines.

BACKGROUND OF THE INVENTION

Blow molding machines are used to form hollow, plastic articles such as milk bottles and other liquid containers. The blow molded article is formed in a mold that is constructed from a pair of mold halves which are clamped together around an extruded section of softened thermoplastic resin (referred to as parison). After clamping, a blow pin is inserted into an opening of the mold and air is then forced through the blow pin into the mold to expand the parison so that it conforms to the surface of the mold cavity. Movement of the blow pin into and out of the opening in the mold cavity is typically done automatically using a blow pin assembly that operates under PLC control.

On shuttle blow molding machines, the mold is usually moved, or shuttled, between an extrusion work station and a blow pin workstation. At the extrusion workstation, an extruder head extrudes a tube of parison between the two halves of an open mold. The mold is then clamped shut around the parison and the mold is transported to the blow pin workstation where a blow pin moves downward and into engagement with the opening in the mold cavity, with the blow pin extending slightly into the center of the tube of parison. Air is then blown into the parison to expand it against the sides of the mold cavity. See, for example, U.S. Pat. No. 4,421,472, issued Dec. 20, 1983 to Merritt W. Martin, Jr.

Sometimes, the rim of the tube of parison collapses or gets folded over, thereby preventing the blow pin from entering into the center of the parison. As a result, the parison is not properly expanded in the mold and the resulting article must be rejected. To avoid this problem, the blow pin has sometimes been used to pre-blow the parison; that is, air is forced through the blow pin as it is being brought down into engagement with the mold to help hold the tube of parison open.

On rotary blow molding machines, the molds are located on a carrousel that indexes the molds in a circle through different workstations. The molds are paused at each workstation for a different operation such as, for example, extrusion of the parison into the mold at an extrusion workstation. On these types of blow molding machines, the blow pin assembly may be mounted on the carrousel so that it indexes with its associated mold. Typically, this is done by mounting the blow pin assembly on the mold clamp so that it moves with one of the two halves of the mold clamp. However, since the blow pins are indexed around through the workstations along with their associated molds, the blow pin assembly must not only move the blow pin into and out of the mold opening, but must also retract the blow pin away from above the opening. Otherwise, the blow pin would interfere with the extrusion head when it dispenses parison at the extrusion workstation.

As a result, blow pin assemblies for rotary blow molding machines have been designed to move the blow pin along an arcuate path between a retracted, or home, position and a mold-engaging position. See, for example, U.S. Pat. No. 4,919,607, issued Apr. 24, 1990 to M. Warren Martin et al. However, one problem with these types of blow pin assemblies is that, because of the arcuate path, the blow pin does not enter the opening along a purely linear path (i.e., along the central axis of the mold cavity that extends through the opening). While the Martin et al. patent utilizes a pivotal linkage that minimizes the arcuate travel of the blow pin as it approaches and enters the opening in the mold, the movement of the blow pin nonetheless has a horizontal component to it that can result in the blow pin catching the upper edge of the parison and folding it over the opening in the tube of parison, making proper expansion of the parison impossible. Also, with this type of blow pin assembly it may not be possible to pre-blow the parison because the blow pin is not entering from directly above the tube of parison and doing so can again fold over the upper edge of the parison.

Accordingly, there exists the need for a blow pin assembly for a rotary blow molding machine that reduces the possibility of the blow pin catching and folding over the edge of the parison and that permits the parison to be pre-blown to better improve the yield of the machine.

SUMMARY OF THE INVENTION

In accordance with the invention there is provided a blow pin assembly which overcomes the above-noted disadvantages of prior art blow pin assemblies used on rotary blow molding machines. The blow pin assembly includes a base, a carriage supported by and movable relative to the base, a sub-base supported by and movable relative to the carriage, and a blow pin mounted to the sub-base for movement therewith. The assembly includes a first actuator that is coupled between the base and the carriage and a second actuator that is coupled between the carriage and sub-base. The first actuator is operable to cause the carriage and sub-base to move relative to the base. The second actuator is operable to cause the sub-base to move relative to the carriage. As a result of activation of the first and second actuators, the blow pin can be reciprocated between a home position and a mold-engaging position with the blow pin moving into and out of the mold-engaging position along a path that is substantially coincident with the central axis that extends through the opening in the mold cavity.

Preferably, the first actuator moves the carriage and sub-base in a direction that is generally perpendicular to the central axis, such that the blow pin moves between the home position and an alignment position in which the blow pin is located directly over the mold opening. The second actuator then moves the sub-base relative to the carriage along the central axis of the opening from the alignment position to the mold-engaging position where the blow pin enters the mold opening.

The blow pin assembly can include a pair of stop members that engage each other when the blow pin has reached its alignment position due to activation of the first actuator. In this way, the blow pin is prevented from moving past the alignment position.

In accordance with another aspect of the invention there is provided a rotary blow molding machine having a plurality of mold stations, each of which includes a blow pin assembly as described above. Preferably, each mold station includes a mold clamp with each blow pin assembly being mounted on its associated mold clamp.

BRIEF DESCRIPTION OF THE DRAWINGS

A preferred exemplary embodiment of the present invention will hereinafter be described in conjunction with the appended drawings, wherein like designations denote like elements, and.

DETAILED DESCRIPTION OF THE PREFERRED EMBODIMENT

Figure 1:
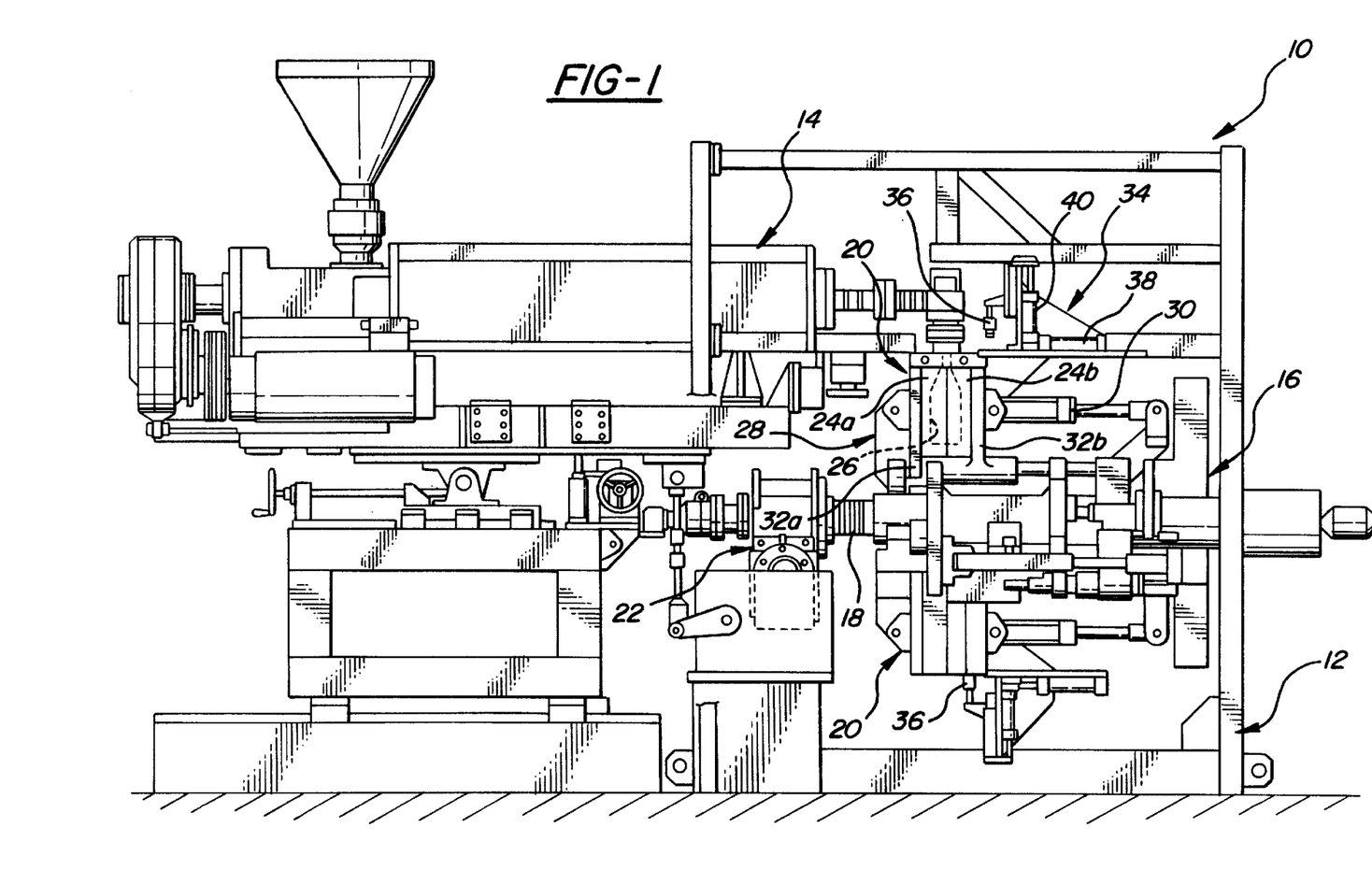
FIG. 1 is a side view of an embodiment of a blow-molding machine of the present invention.

FIG. 1 depicts a rotary blow-molding machine 10 of the present invention. In general, blow-molding machine 10 includes a support frame 12, a parison extruder 14, and a carrousel 16 which is supported by an axle 18 on frame 12. Mounted on carrousel 16 are a number of mold stations 20 spaced angularly around the axis defined by axle 18. In the illustrated embodiment, four mold stations 20 are utilized and it will be appreciated that blow-molding machine 10 can be designed to accommodate other numbers of mold stations (e.g., six or eight mold stations). Axle 18 is driven by an indexer 22 which is used to angularly index mold stations 20 around a circular path between a number of workstations. These workstations include a parison extrusion workstation at which extruder 14 is located and an article take-out workstation (not shown) at which is located a standard take-out mechanism (also not shown). If desired, other workstations, such as an in-mold labelling workstation, can be included around the path taken by mold stations 20.

Each mold station 20 includes at least one mold 24 that comprises a pair of mold halves 24a, 24b that mate together to form a mold cavity 26 which defines the ultimate shape of the article being manufactured by blow-molding machine 10. The mold halves are mounted in a clamp 28 that can be opened and closed under the force provided by a hydraulic cylinder 30. Clamp 28 includes a pair of opposed platens 32a, 32b on which the two mold halves 24a, 24b are mounted, respectively. When clamp 28 is closed, platens 32a, 32b press the mold halves tightly together under the force exerted by hydraulic cylinder 30. Clamp 28 can be constructed as shown in U.S. Pat. No. 4,248,582, issued Feb. 3, 1981 to Merritt W. Martin, Jr., the entire contents of which are hereby incorporated by reference.

In addition to supporting mold half 24b, platen 32b also supports a blow pin assembly 34 constructed in accordance with the present invention. In general, blow pin assembly 34 includes a blow pin 36 and a pair of air cylinders 38, 40 that together move the blow pin between a retracted, or home, position and a mold-engaging position in which blow pin 36 is in position to expand the parison within mold 24. Air cylinders 38 and 40 move blow pin 36 along orthogonally-related paths, with air cylinder 38 moving blow pin 36 axially into an alignment position over the central axis (CL) of mold cavity 26 and air cylinder 40 moving blow pin 36 radially from the alignment position to the mold-engaging position. By operating air cylinders 38 and 40 sequentially, blow pin 36 can be moved into and out of the mold-engaging position along a path that is coincident with the central axis CL of mold cavity 26. This helps minimize the possibility that blow pin 36 will catch and fold over an edge of the parison. This also permits pre-blowing of blow pin 36, which helps insure that the tube of parison remains open as the blow pin enters the opening 26a in mold 24.

The construction and operation of blow pin assembly 34 can be further understood by reference to FIGS. 2–5. Assembly 34 includes blow pin 36, air cylinders 38, 40, a base 42, a carriage 44 that slides along a pair of rails 46a, 46b relative to base 42, and a sub-base 48 that slides along a second pair of rails 50a, 50b relative to carriage 44. Base 42 is an axially extending plate that is unitary with platen 32b. Rails 46a, 46b are mounted on base 42 parallel to one another and are located near respective side edges 42a, 42b of base 42. Carriage 44 is slidably supported on rails 46a, 46b by two sets of bearing blocks 52a, 52b, with each set being used to support carriage 44 on a different one of the two rails 46a, 46b. Carriage 44 includes a pair of lower support plates 54a, 54b, a forward-facing base plate 56, a pair of opposed, reinforcing side walls 58a, 58b, and a cross brace 60 that extends between side walls 58a, 58b. The two sets of bearing blocks 52a, 52b are mounted on the bottom side of lower support plates 54a, 54b, respectively. Side walls 58a, 58b are mounted to and extend upwards from the upper side of lower support plates 54a, 54b, respectively, and are each connected to the back side 56a of base plate 56. Air cylinder 38 includes a piston housing 38a mounted to base 42 and a rod 38b that is secured to base plate 56 using a bolt 62 shown in FIG. 2. Air cylinder 38 is operated in a conventional manner to move rod 38b into and out of housing 38a, as desired. This causes carriage 44 to move linearly along rails 46a, 46b, resulting in blow pin 36 moving between the retracted position and the alignment position where it is located directly above opening 26a in mold 24.

Figure 2:
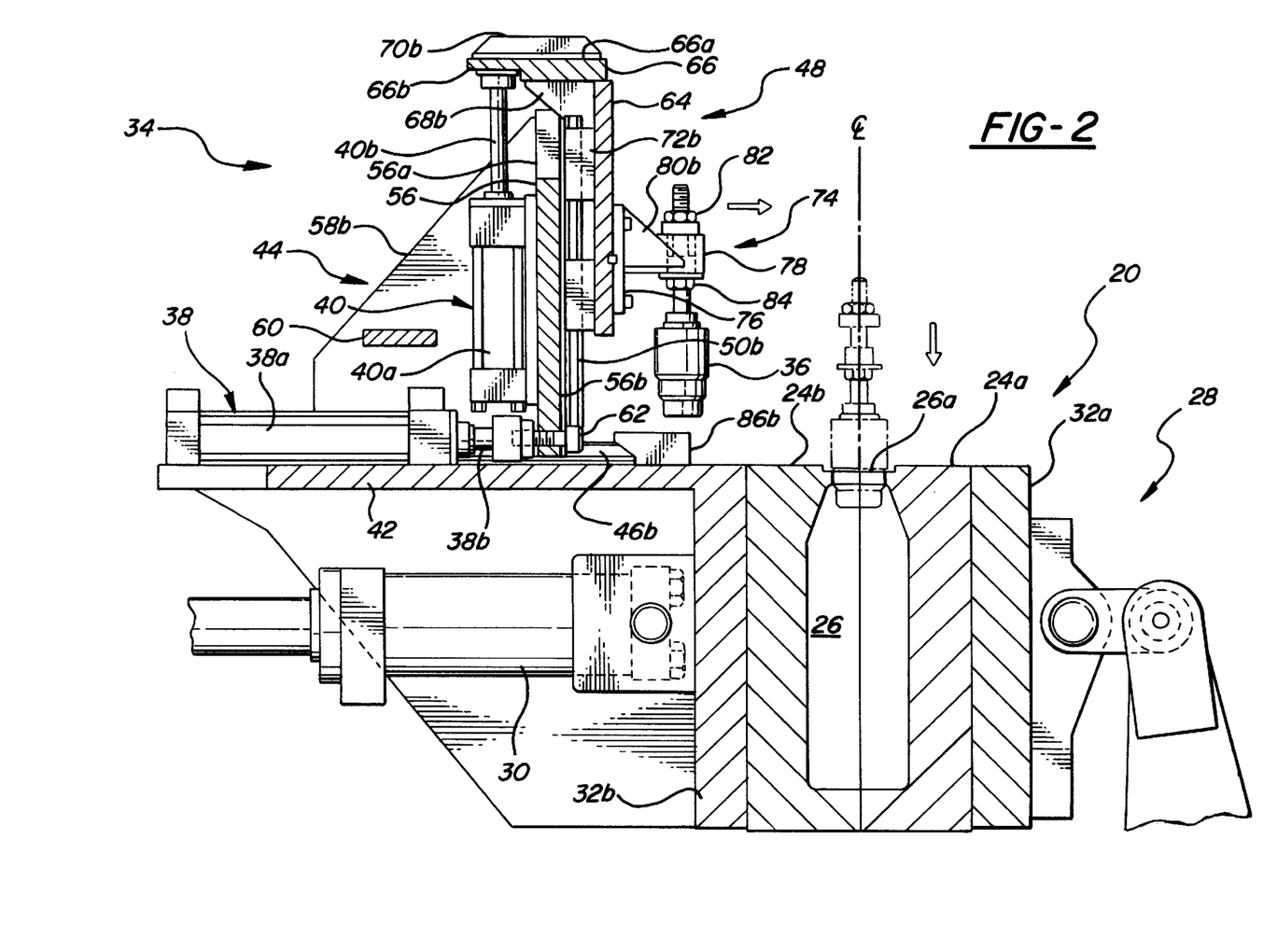
FIG. 2 is a cross-sectional side view taken along the 2—2 line of FIG. 3 showing the blow pin assembly of FIG. 1.
Figure 3:
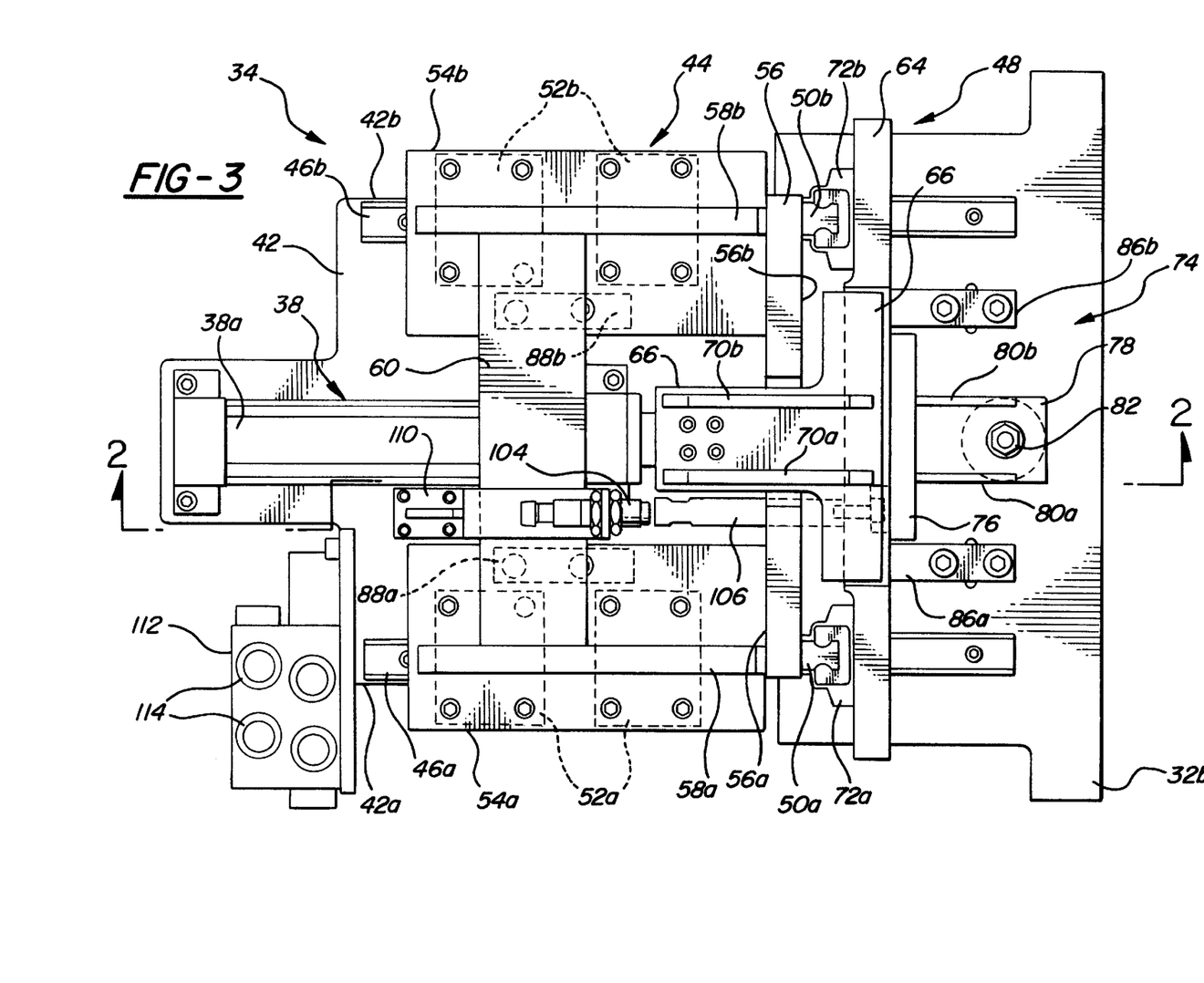
FIG. 3 is a top view of the blow pin assembly of FIG. 1.
Figure 4:
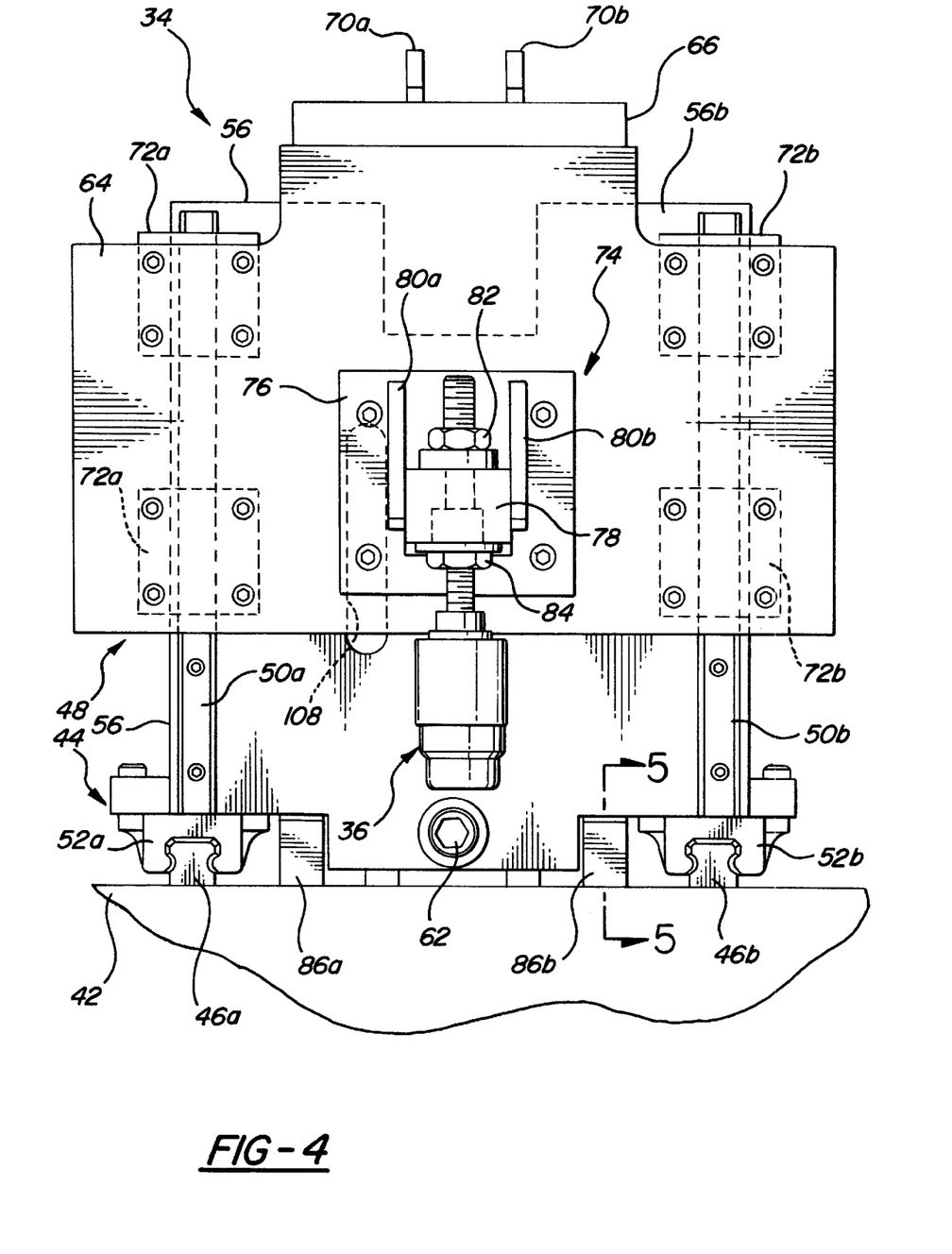
FIG. 4 is a front view of the blow pin assembly of FIG. 1.

The fundamental features of the mounting and construction of sub-base 48 are similar to those of carriage 44. In particular, sub-base 48 includes a mounting plate 64, a top plate 66, a pair of angle brackets 68a, 68b (only one shown) that connect mounting plate 64 to top plate 66, and a pair of stiffening ribs 70a, 70b mounted on the upper surface 66a of top plate 66. Connected to mounting plate 64 are two additional sets of bearing blocks 72a, 72b which are used to attach sub-base 48 to the second pair of rails 50a, 50b so that it may slide relative to carriage 44. Rails 50a, 50b are mounted parallel to one another on the front side 56b of base plate 56. Air cylinder 40 includes a housing 40a mounted on base plate 56 and a rod 40b connected to a recessed, rearward extension 66b of top plate 66. Activation of air cylinder 40 causes extension or retraction of rod 40b, thereby causing top plate 66, mounting plate 64, and thus blow pin 36, to move radially toward or away from mold 24. As will be appreciated by those skilled in the art, this use of air cylinder 40 provides a more direct application of force by blow pin 36 onto opening 26a of mold 24 than is provided by the pivotal linkage blow pin assemblies that have heretofore been used on rotary blow molding machines.

Preferably, air cylinders 38 and 40 are sequentially activated so that blow pin 36 moves axially to the alignment position and then radially to the mold-engaging position shown in broken lines in FIG. 2. However, it will be appreciated that air cylinder 40 can be activated prior to the arrival of blow pin 36 at the alignment position with the net effect being that blow pin 36 moves in an inclined direction for at least a portion of the path between the home and mold-engaging positions. Although air cylinders 38 and 40 can be simultaneously operated in this manner, it will be appreciated that air cylinder 38 should be activated so that blow pin 36 arrives in position at the central axis of mold cavity 26 while it is still far enough away from opening 26a so that it will not catch and fold over an edge of the parison.

With particular reference to FIGS. 2 and 4, blow pin 36 is attached to mounting plate 64 using a bracket assembly 74 that includes an interface plate 76, a support block 78, and a pair of angle brackets 80a, 80b. Interface plate 76 is bolted to mounted plate 64 and can be keyed to mounting plate 64 to provide an exacting relative alignment. Support block 78 and angle brackets 80a, 80b are all connected to interface plate 76 and can be made integral (as by welding) or unitary (as by machining from a single block of metal) with interface plate 76. Blow pin 36 is mounted through an oversized bore within support block 78 and is locked securely in place on support block 78 by a pair of jam nuts 82, 84.

The use of an oversized bore through support block 78 permits adjustment of the precise position of blow pin 36 relative to sub-base 48. This allows blow pin 36 to be adjusted as a part of the initial machine setup so that it coincides precisely with the central axis of cavity 26 when moved to the alignment position by air cylinder 38. To provide precise control of the extent of axial movement of blow pin 36 when rod 38b of air cylinder 38 is extended, base 42 includes a pair of stop members, or wedge stops, 86a, 86b that mate with corresponding wedge stops 88a, 88b located on carriage 44. Wedge stops 86a, 86b are located relative to wedge stops 88a, 88b, respectively, such that they engage upon arrival of blow pin 36 at the alignment position to thereby prevent blow pin 36 from moving past the alignment position.

Figure 5:
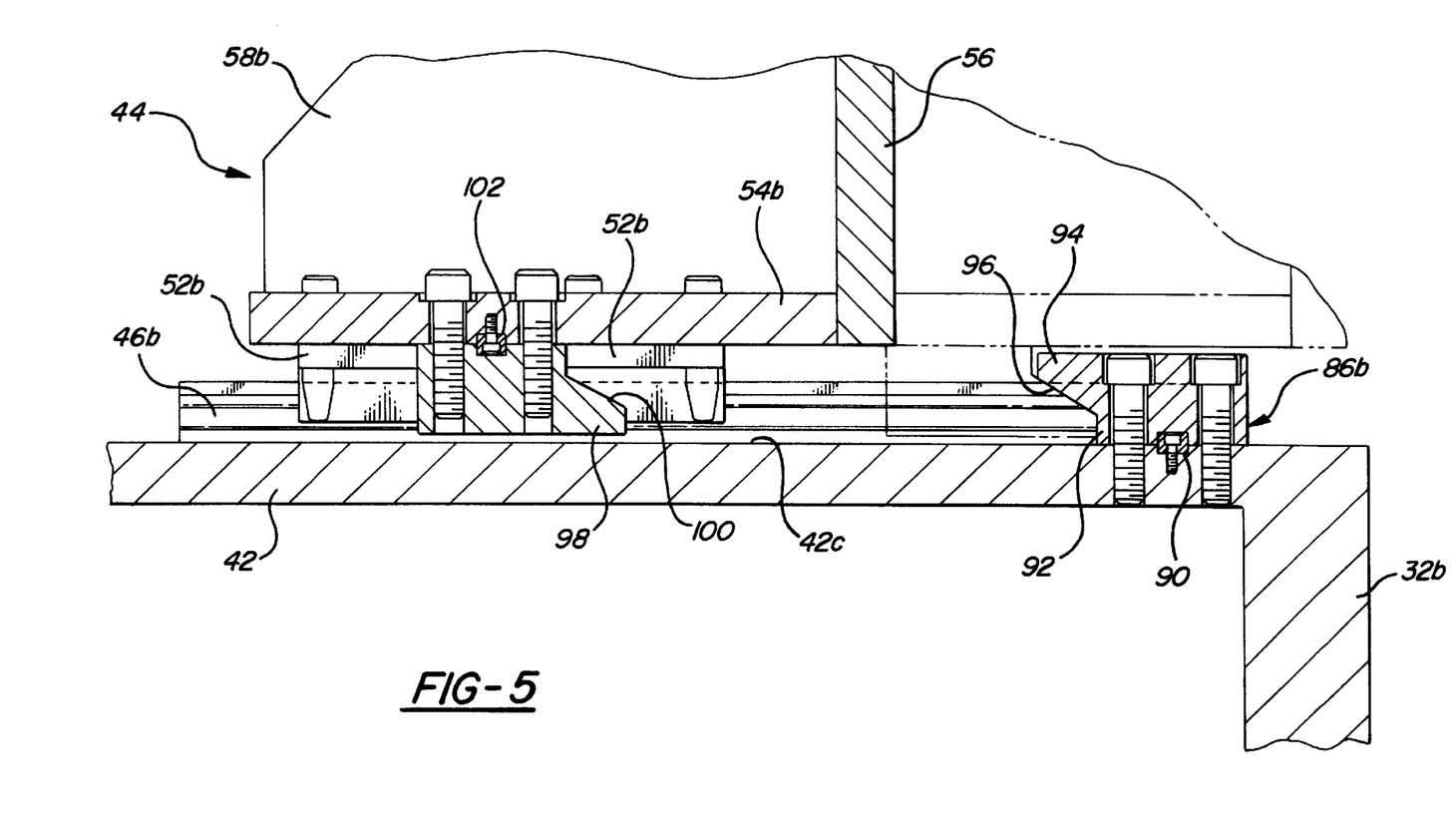
FIG. 5 is an enlarged, fragmentary cross-sectional view taken along the 5—5 line of FIG. 4 and showing the construction and relative positioning of the wedge stops used to define the horizontal limit of movement of the blow pin.

The construction and use of wedge stops 86a, 86b, 88a, and 88b can be understood more clearly by reference to FIG. 5 which depicts the mounting and relative positioning of wedge stops 86b and 88b. Although the following description is directed specifically to wedge stops 86b and 88b, it will be appreciated that the description applies equally to wedge stops 86a and 88a which are located proximate rail 46a and bearing blocks 52a, respectively. As shown, wedge stop 86b is bolted onto base 42 beside rail 46b and is precisely positioned using a key 90 that is bolted to base 42. Wedge stop 86b has a lower section 92, an upper projecting section 94, and an inclined surface 96 that extends at an angle from the upper projecting section to the lower section. Inclined surface 96 is located generally opposite the upper surface 42c of base 42 and, in particular, is located at an acute angle with respect to upper surface 42c such that the two surfaces define a converging space therebetween. Wedge stop 88b has a protruding portion 98 having substantially the same shape as this converging space. The protruding portion 98 includes an inclined surface 100 that engages inclined surface 92 (as shown in phantom) when rod 38b is extended out of air cylinder 38. When surfaces 92 and 100 engage, wedge stop 88b is forced downward and is captured between inclined surface 92 and upper surface 42c of base 42. The downward force resulting from engagement of surfaces 92 and 100 forces bearing blocks 52b down tightly against rail 46b thereby removing any slack that might exist between the bearing blocks and rail. As shown in FIG. 5, wedge stops 86b and 88b can be identical in shape, with wedge stop 88b being mounted on the underside of lower support plate 54b in an orientation that is upside-down relative to that of wedge stop 86b on base 42. As with wedge stop 86b, a key 102 can be used for precise positioning of wedge stop 88b on carriage 44. Preferably, the wedge stops 86b and 88b are positioned so that they engage just before rod 38a reaches its fully extended position. In this way, a constant pressure is provided that holds surfaces 92 and 100 into engagement and that thereby locks carriage 44 in place at a known position.

If desired, the mounting of either or both wedge stops 86b and 88b can be made adjustable so that blow pin 36 will be precisely located at the alignment position (i.e., coincident with the central axis of the mold cavity 26a) when air cylinder 38 is activated. Optionally, the wedge stops can be designed to have a single, fixed position, as shown in the illustrated embodiment, and precise alignment of blow pin 36 can be achieved by adjusting the position of blow pin 36 within the oversized bore in support block 78.

Referring back to FIG. 3, blow pin assembly 34 includes a proximity switch 104 that is used to detect when blow pin 36 is at the home position shown in the figures. Proximity switch 104 is activated by a post 106 that extends horizontally from mounting plate 64 through a slot 108 (FIG. 4) in base plate 56 of carriage 44. Post 106 moves with sub-base 48 as a result of activation of either air cylinder and comes into the proximity of switch 104 upon blow pin 36 being returned to its home position. Proximity switch 104 is mounted to base 42 by a right-angle bracket 110 that is bolted to base 42 and that extends vertically upwards behind cross brace 60 and then horizontally over brace 60 to the position shown in FIG. 3. Proximity switch 104 is used as a part of the electronic control of blow pin assembly 34 to provide verification that blow pin 36 is at its home position and, in particular, that rod 38b of air cylinder 38 is fully retracted and rod 40b of air cylinder 40 is fully extended. As will be appreciated, proximity switch 104 can be activated magnetically, mechanically, optically, or otherwise, depending upon the type of proximity switch used.

Also shown in FIG. 3 is a support plate 112 that is mounted on base 42 and that holds the valves 114 required to operate air cylinders 38 and 40. Valves 114 can be conventional solenoid-operated pneumatic valves, the use of which is known by those skilled in the art.

It will thus be apparent that there has been provided in accordance with the present invention a blow molding machine and blow pin assembly therefor which achieves the aims and advantages specified herein. It will of course be understood that the foregoing description is of a preferred exemplary embodiment of the invention and that the invention is not limited to the specific embodiment shown. Various changes and modifications will become apparent to those skilled in the art and all such variations and modifications are intended to come within the scope of the appended claims.

I claim:

1. A blow pin assembly for use with a rotary blow molding machine having a plurality of molds, each of which has at least two mold sections that mate together to define a mold cavity having an opening and a central axis extending through the opening, the blow pin assembly comprising:

a base;

a carriage supported by said base, said carriage being movable relative to said base;

a sub-base supported by said carriage, said sub-base being movable relative to said carriage;

a blow pin mounted to said sub-base and being movable with said sub-base relative to said carriage and said base;

a first actuator coupled between said base and said carriage, said first actuator being operable to cause said carriage and said sub-base to move relative to said base; and a second actuator coupled between said carriage and said sub-base, said second actuator being operable to cause said sub-base to move relative to said carriage, wherein, as a result of activation of said first and second actuators, said blow pin can be reciprocated between a home position and a mold-engaging position and wherein said blow pin moves into and out of said mold-engaging position along a path that is substantially coincident with the central axis of the mold cavity.

2. A blow pin assembly as defined in claim 1, further comprising a control system coupled to said first and second actuators, said control system being operable to cause said first actuator to move said carriage relative to said base and to cause said second actuator to move said sub-base relative to said carriage.

3. A blow pin assembly as defined in claim 2, wherein:
said actuators are linear actuators each having an output member that can move between a retracted position and an extended position,
said carriage is movable relative to said base in a first direction that is generally perpendicular to the central axis of the mold cavity; and
said sub-base is movable relative to said carriage in a second direction that is parallel to the central axis of the mold cavity.

4. A blow pin assembly as defined in claim 3, wherein said control system is operable to cause said actuators to move said blow pin from said home position to said mold-engaging position by sequential activation of said actuators beginning with movement of said first actuator's output member between its retracted and extended positions followed by movement of said second actuator's output member between its retracted and extended positions.

5. A blow pin assembly as defined in claim 1, wherein said actuators are activated sequentially.

6. A blow pin assembly as defined in claim 1, wherein said first actuator is operable to move said blow pin from said home position to an alignment position in which said blow pin is located along the central axis of the mold cavity and wherein said second actuator is operable to move said blow pin along said central axis from said alignment position to said mold-engaging position.

7. A blow pin assembly as defined in claim 6, wherein said base includes at least one stop member that engages at least one corresponding stop member on said carriage to stop said blow pin at said alignment position when said first actuator is activated.

8. A blow pin assembly as defined in claim 6, wherein said base includes first and second surfaces located generally opposite each other with said first surface being disposed at an acute angle relative to said second surface whereby said first and second surfaces define a converging space therebetween, wherein said carriage includes a stop member with a protruding portion that engages said first and second surfaces when said first actuator is activated, and wherein said protruding portion of said stop member has a shape that is substantially the same as said converging space, whereby said protruding portion becomes captured in said converging space when said first actuator is activated to thereby prevent said carriage from moving said blow pin past said alignment position.

9. A blow pin assembly as defined in claim 8, wherein said base includes a stop member having said first and second surfaces and wherein said stop member on said base further comprises a lower section and an upper projecting section with said first surface extending at said angle from said upper projecting section to said lower section, whereby said stop member on said carriage is captured between said upper projecting section and said second surface to prevent said blow pin from moving past said alignment position when said first actuator is activated.

10. A blow pin assembly as defined in claim 1, wherein said second actuator is a linear actuator having an output member that reciprocates between a retracted position and an extended position along an axis that is parallel to the central axis of the mold cavity.

11. A rotary blow molding machine, comprising:
a carrousel mounted for rotational movement;
an indexer mechanically coupled to said carrousel to index said carrousel between a number of angular positions;
a plurality of mold stations disposed around said carrousel, each of said mold stations including a clamp having an open position and a closed position, said clamps being operable to clamp together mold sections that together define a mold cavity having an opening and a central axis extending through the opening;
a blow pin assembly mounted at each of said mold stations, said blow pin assemblies each including:
a base;
a carriage supported by said base, said carriage being movable relative to said base;
a sub-base supported by said carriage, said sub-base being movable relative to said carriage;
a blow pin mounted to said sub-base and being movable with said sub-base relative to said carriage and said base;
a first actuator coupled between said base and said carriage, said first actuator being operable to cause said carriage and said sub-base to move relative to said base; and
a second actuator coupled between said carriage and said sub-base, said second actuator being operable to cause said sub-base to move relative to said carriage, wherein, as a result of activation of said first and second actuators, said blow pin can be reciprocated between a home position and a mold-engaging position and wherein said blow pin moves into and out of said mold-engaging position along a path that is coincident with the central axis of the mold.

12. A rotary blow molding machine as defined in claim 11, further comprising a control system coupled to said first and second actuators, said control system being operable to cause said first actuator to move said carriage relative to said base and to cause said second actuator to move said sub-base relative to said carriage.

13. A rotary blow molding machine as defined in claim 12, wherein:
said actuators are linear actuators each having an output member that can move between a retracted position and an extended position,
said carriage is movable relative to said base in a first direction that is generally perpendicular to the central axis of the mold cavity; and
said sub-base is movable relative to said carriage in a second direction that is parallel to the central axis of the mold cavity.

14. A rotary blow molding machine as defined in claim 13, wherein said control system is operable to cause said actuators to move said blow pin from said home position to said mold-engaging position by sequential activation of said actuators beginning with movement of said first actuator's output member between its retracted and extended positions followed by movement of said second actuator's output member between its retracted and extended positions.

15. A rotary blow molding machine as defined in claim 11, wherein, for each of said mold stations, said base is mounted on said clamp.

16. A rotary blow molding machine as defined in claim 11, wherein said first actuator is operable to move said blow pin from said home position to an alignment position in which said blow pin is located along the central axis of the mold cavity and wherein said second actuator is operable to move said blow pin along said central axis from said alignment position to said mold-engaging position.

17. A rotary blow molding machine as defined in claim 16, wherein said base includes first and second surfaces located generally opposite each other with said first surface being disposed at an acute angle relative to said second surface whereby said first and second surfaces define a converging space therebetween, wherein said carriage includes a stop member with a protruding portion that engages said first and second surfaces when said first actuator is activated, and wherein said protruding portion of said stop member has a shape that is substantially the same as said converging space, whereby said protruding portion becomes captured in said converging space when said first actuator is activated to thereby prevent said carriage from moving said blow pin past said alignment position.

18. A rotary blow molding machine as defined in claim 17, wherein said base includes a stop member having said first and second surfaces and wherein said stop member on said base further comprises a lower section and an upper projecting edge with said first surface extending at said angle between said upper projecting edge and said lower section, whereby said stop member on said carriage is captured between said upper projecting edge and said second surface to prevent said blow pin from moving past said alignment position when said first actuator is activated.

19. A rotary blow molding machine as defined in claim 11, wherein said second actuator is a linear actuator having an output member that reciprocates between a retracted position and an extended position along an axis that is parallel to the central axis of the mold cavity.

20. A rotary blow molding machine, comprising:

a carrousel mounted for rotational movement;

an indexer mechanically coupled to said carrousel to index said carrousel between a number of angular positions;

a plurality of mold stations disposed around said carrousel, each of said mold stations including a clamp having an open position and a closed position, with said clamps each including a pair of opposed platens that move in a clamping direction between said open and closed positions;

a blow pin assembly mounted at each of said mold stations, said blow pin assemblies each including:
- a base mounted on said clamp;
- a carriage supported by said base, said carriage being movable relative to said base in said clamping direction;
- a sub-base supported by said carriage, said sub-base being movable relative to said carriage in a direction perpendicular to said clamping direction;
- a blow pin mounted to said sub-base and being movable with said sub-base relative to said carriage and said base;
- a first linear actuator coupled between said base and said carriage, said first linear actuator being operable to cause said carriage and said sub-base to move in said clamping direction relative to said base; and
- a second linear actuator coupled between said carriage and said sub-base, said second linear actuator being operable to cause said sub-base to move relative to said carriage in said perpendicular direction; and a control system coupled to said first and second linear actuators, said control system being operable to cause said linear actuators to move said blow pin from a home position to a mold-engaging position by sequential activation of said actuators.

* * * * *